June 6, 1939. C. R. DOTY ET AL 2,161,563
CLUTCH DEVICE
Filed April 22, 1936  2 Sheets-Sheet 1

Inventors
Charles R. Doty
Kurt R. Schneider
Albert C. Holt
BY W. M. Wilson
ATTORNEY June 6, 1939.  C. R. DOTY ET AL  2,161,563
CLUTCH DEVICE
Filed April 22, 1936   2 Sheets-Sheet 2

Inventors,
Charles R. Doty
Kurt R. Schneider
Albert C. Holt
BY W. M. Wilson
ATTORNEY Patented June 6, 1939

2,161,563

UNITED STATES PATENT OFFICE 2,161,563

CLUTCH DEVICE

Charles R. Doty, Binghamton, and Kurt R. Schneider, Endicott, N. Y., and Albert C. Holt, Princeton, N. J., assignors to International Business Machines Corporation, New York, N. Y., a corporation of New York Application April 22, 1936, Serial No. 75,692

6 Claims. (Cl. 192—40)

This invention relates to clutch mechanisms and more particularly to electromagnetically controlled clutches of the type adapted for both intermittent and continuous operation in accordance with the control signal or impulse.

It is an object of the present invention to provide a device comprising a rotating driving member and a driven member which may be operated step by step or continuously, depending upon the controlling impulse. Electromagnetic controlling means are provided to cooperate with the clutch members and in part consists of two controlling coils with associated armature members controlling the clutching and de-clutching functions of the device. One of the controlling units is adapted to control the step-by-step operation of the clutch device and in addition thereto is characterized by the provison of means whereby the clutching action is delayed until the decay of the controlling impulse. The other controlling unit is adapted to control the continuous operation of the said device and the clutching action is effected upon receipt of the controlling impulse.

Various other objects and advantages of the invention will be obvious from the following particular description of one form of mechanism embodying the invention or from an inspection of the accompanying drawings; and the invention also constitutes certain new and useful features of construction and combination of parts hereinafter set forth and claimed.

Figure 1:
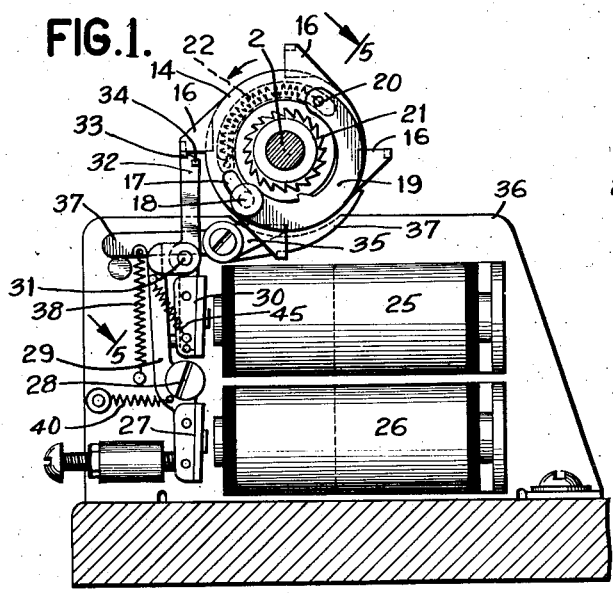
Fig. 1 is a side view of the clutch mechanism.
Figure 3:
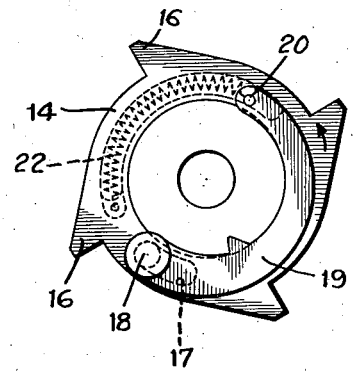
Figs. 3 and 4 are detailed views, in part, of the clutching and de-clutching members.
Figure 2:
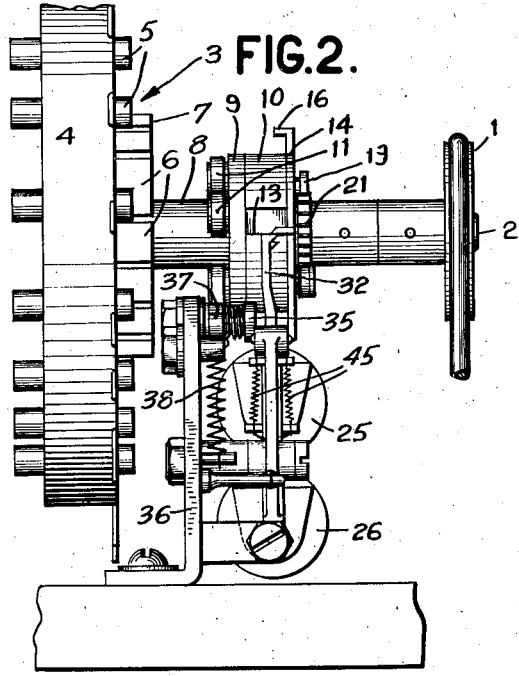
Fig. 2 is an elevation view of the clutch mechanism.
Figure 4:
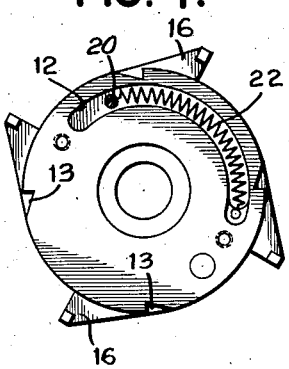

Referring now to Figs. 1 and 2 of the drawings, suitable means such as a pulley 1 is shown to be adapted to continuously operate the driving shaft 2. One form of a controlled or driven member is shown as a commutator device 3 comprising in general a stationary ring member 4 adapted to suport a plurality of brush members 5 adapted to cooperate with the insulated conducting segments 6 of a commutator ring 7 which is secured to a rotatable sleeve member 8. It is to be understood that the commutator device is merely an example of one form of a device which may be driven in accordance with the principles of the invention by a continuously driving member such as the shaft 2.

The sleeve member 8 is secured to or may be an integral part of a disk 9 which is fixed to a drum 10. The said disk is provided with a plurality of cam rollers 11, the number of cam rollers provided depending upon the number of step-by-step operations desired by the clutch device during a single revolution thereof. The drum 10 rotatably mounted on shaft 2 is provided with an arcuate opening 12 therein. A plurality of notches 13 are disposed upon the outer section of said drum, the number of said notches necessary to be provided depending upon the number of step-by-step operations desired during one revolution of the clutch device, and will be understood as the description progresses.

Figure 5:
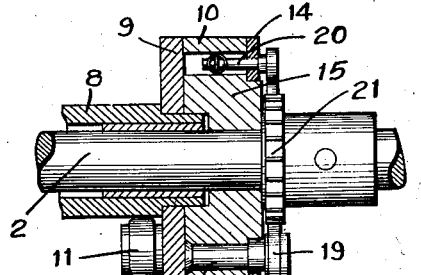
Fig. 5 is a section view along the line 5—5 of Fig. 1.

A plate 14 is rotatably mounted on a shoulder section 15 which may be an integral part of the drum 10 (Fig. 5) said plate being provided with a plurality of stop pawl members 16, the purpose of which will be described later herein. The plate 14 is also provided with an elongated opening 17 to permit a pin 18 which is secured to the drum 10 to extend through the said opening of the plate 14. At the free extremity of pin 18, a coupling pawl 19 is pivotaly mounted thereon, the other end of which has attached thereto a pin 20 which protrudes through an opening in the plate 14 and extends into the opening 12 in the drum 10. The movement of the plate 14 is obviously limited by the elongated opening 17 therein. This opening is elongated to such an extent as to permit the coupling pawl 19 to engage and disengage with the teeth of a ratchet wheel 21. The free end of the pin 20 is coupled to a spring 22 which is attached to the body of drum 10. Through the agency of the spring 22, the plate 14 is urged in the direction shown but the movement of plate 14 is prevented by the limited elongation of the opening 17 in the plate and the pin 18 mounted in drum 10.

The ratchet wheel 21 is secured to the continuously rotated shaft 2 and adapted to cooperate with the coupling pawl 19.

Controlling units in the form of electromagnets are provided and comprise two magnet coils 25 and 26. The armature 27 associated with coil 26 is pivoted at 28 and provide with an extension arm 29. Upon the said extension arm, the armature 30 associated with coil 25, is pivotally mounted as shown at 31.

The armature 30 is provided with an extension arm 32 which is adapted to be a stop arm for the clutch device. The said stop arm at its free extremity is provided with two projecting fingers or stops 33 and 34. Stop 34 is positioned below the stop 33 but not in the same plane as stop 33.

When the said magnet coils are deenergized and the associated armatures are not attracted thereby, the positions of the various parts of the clutch device are shown in Fig. 1. It is seen that the stop 33 is adapted to engage one of the stop pawls 16 and prevent any rotation of the plate 14.

It is to be noted in the position of the parts shown in the said figure, that due to the engagement of the stop pawl 16 and stop 33, the plate 14 is urged against the action of spring 22 to be rotated about the drum 10 so far as the elongated opening 17 of the plate permits. In this position, the coupling pawl 19 is held out of engagement with the ratchet wheel 21.

It should be mentioned at this time that a spring-pressed pawl 35 mounted on plate 36 is adapted to engage one of said notches 13 in the drum 10 to lock the clutch device in an inoperative position as shown. An arm 37 is also pivotally mounted on plate 36 and is adapted to engage the cam rollers 11 and constantly urged into engagement therewith by spring 38.

Figure 10:
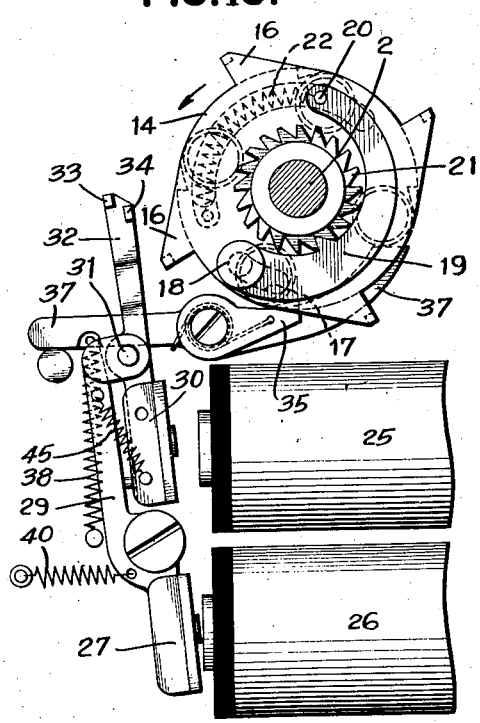

The operation of the clutch device will now be explained, referring to Figs. 1 and 10, assuming that the coil 26 is energized by a control impulse causing the associated armature 27 to be attracted.

The movement of the said armature is such as to permit the stops 33 and 34 to clear the stop pawls 16 on plate 14. Due to the release of the plate 14, the said plate is urged to rotate in the direction indicated by the arrows due to the spring 22. The rotation of plate 14 is limited by the opening 17 as explained hereinbefore. However, the movement initiated by the said spring and the extent of the movement is such as to be adapted to permit the pawl 19 to engage one of the teeth of the rotating ratchet wheel 21. So long as the coil 26 is energized by the controlling impulse the associated armature 27 is maintained in the position shown in Fig. 10 and thereby permitting the coupling pawl 19 to engage the ratchet wheel 21 during the entire interval or period of time the said impulse is impressed upon the coil 26.

It is obvious from the previous description, upon engagement of pawl 19 with ratchet 21, the plate 14, drum 10 and disk 9 and sleeve 8 are rotated in unison with the said ratchet wheel and driving shaft. The commutator 7 attached to sleeve 8 is therefore rotated to present the conducting segments thereof in succession to the stationary cooperating brushes.

Upon deenergization of the coil 26, the armature 27 is immediately restored to the normal position, as shown in Fig. 1, by virtue of spring 40, to position the stop 33 in the path of the stop pawls 16 to effect declutching of the device. Immediately upon engagement of the stop pawl 16 and stop 33, the drum 10, due to the direct connection to pawl 19 by pin 18, is continued to be driven by the ratchet wheel 21.

Figure 8:
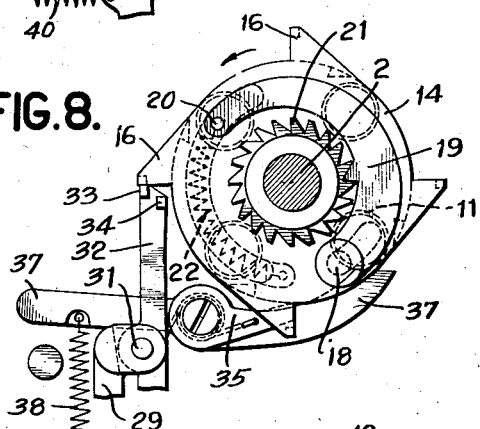
Figure 9:
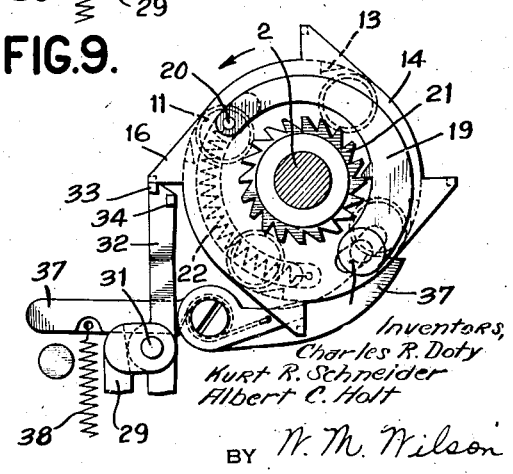

The advancement or additional rotation of drum 10 after the rotation of plate 14 has been blocked, causes the coupling pawl 19 to be disengaged from the driving ratchet. It is remembered that one extremity of pawl 19 is attached to pin 20 which extends through an opening in plate 14. This opening is such that the pin 20 is not afforded much movement; therefore, when the rotation of plate 14 is blocked, the pin 20, in effect, becomes a fixed axis or pivot for pawl 19. Therefore, as the other extremity of the said pawl (attached to drum 10) is urged forward due to the rotation of drum 10, the pawl 19 is lifted out of engagement with the ratchet teeth. When complete disengagement or declutching has been effected, the arm 37 urged by spring 38 imparts an additional movement to drum 10 by its engagement with the cam rollers 11 on disk 9, to position the drum 10 so that the one of the notches 13 is engaged by the cooperating pawl 35 to lock the clutch in the inoperative or declutched postion. Figs. 1, 8, 9, and 10 clearly set forth the various steps just outlined for the declutching action. In Fig. 8, the position of the clutch parts is shown just as the stop pawl 16 engages the stop 33. In Fig. 9, the effect of further rotation of the drum 10 when the plate 14 is blocked is shown and it is seen that the pawl 19 is just beginning to be disengaged from the ratchet wheel. In Fig. 1, the position of the parts is shown when complete declutching has been effected and the clutch unit is locked in the inoperative or declutched position.

Figure 6:
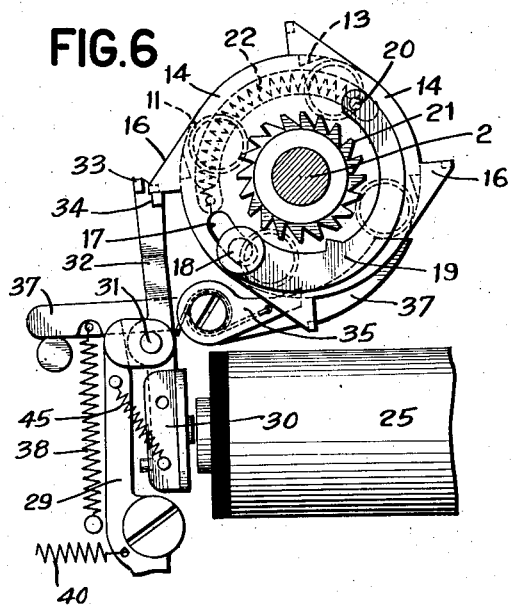
Figs. 6-10 are detailed views of the clutch device in various operating positions.

Now assuming that the coil 25 is energized to attract the armature 30 which, as stated before, is pivoted at 31 on extension arm 29, the movement permitted to be imparted to armature 30 and the extension arm 32 is sufficient that the stop 33 is withdrawn from stop pawl 16 to the extent that the said pawl is permitted to drop to engage the second stop 34. The movement imparted to the armature 30 is not great enough to permit the stop pawl 16 to pass or clear the stop 34 during the interval the armature is attracted by said coil. Referring to Fig. 6, the positions of the clutch parts just described are clearly shown.

Figure 7:
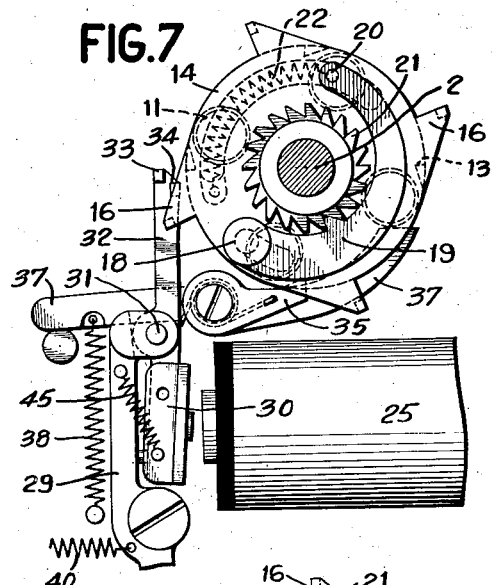

It is understood when the stop pawl 16 is released by stop 33, the plate 14 is advanced to the position so that the stop pawl engages stop 34, due to the tension exerted on the pin 20 by spring 22 and thereby urging the plate 14 forward and imparting a slight rotation thereto. Further movement of the plate 14 by the spring is prevented by the stop 34, and it is noted that the movement imparted to plate 14 is not sufficient to permit the pawl 19 to engage the ratchet wheel 21. The clutching action is completed upon the decay of the impulse, that is, upon deenergization of coil 25. Deenergization of said coil permits the armature to return to normal position as shown in Figs. 1 and 7 by virtue of springs 45, and this permits the stop pawl 16 to be released by stop 34 to effect the clutching action. The cluching action upon deenergization of coil 25 is effected by the release of stop pawl 16 and its release from the stop 34 is due to the return of armature extension arm 32 to its normal position and the configurations of the stops 33 and 34 and the stops 16 on the plate 14. Referring to Figs. 1 and 2, it is seen that the said stops are disposed in a staggered relationship in different planes on the extension arm 32 and that the stop 33 and stops 16 are so shaped that when the stop 16 engages stop 34 and the arm 32 is moved to the right as viewed in Figs. 1 and 6, the stop 33 is not effective to block the said movement to the right. Therefore, when the arm 32 is returned to its normal position by springs 45 the stop 34 is removed from the path of the stop 16 so that further action of the spring 22 is effective to position the plate 14. The plate 14 is urged by spring 22 and a partial rotation is imparted thereto, the amount of rotation of plate 14 permitted being limited by the opening 17 therein. However, as stated hereinbefore, this movement permitted is sufficient for the clutching pawl 19 to engage the ratchet wheel 21.

It is noted that the plate 14 is provided with four stop pawls 16, therefore, it is obvious that the clutch is effective to operate the associated control device such as the commutator device 3 for only one quarter of a complete revolution. At the end of the one quarter revolution declutching is effected similarly as described hereinbefore in conjunction with Figs. 1, 8, and 9.

It is to be understood that it is intended not to be limited to the specific example cited, but that the scope of the invention is broad enough to cover any predetermined number of clutching and declutching operations during a complete revolution.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. A device of the character described comprising a driving member, a driven member, a clutch unit including a clutch operating element adapted to operate said members in unison upon operation of said element, a plurality of electromagnetic control elements, means to render the clutch unit effective to operate the said members continuously upon energization of one of said control elements, and means to render the clutch unit effective to operate the said members a predetermined extent upon the deenergization of another of said control elements.

2. A device of the character described comprising a driving member, a driven member, a unit adapted to actuate said members in unison upon operation thereof, a plurality of electromagnetic control elements, and means to render said unit effective to actuate said members in unison continuously upon energization of one of said control elements and to render said unit effective to actuate said members in unison a predetermined extent upon the deenergization of another of said control elements.

3. A device of the character described comprising a driving member, a driven member, a clutch unit including a clutch operating element adapted to actuate said members in unison upon operation of the element, an electromagnetic control element, means to condition the clutch unit and element upon energization of the said control element and means to render the conditioned clutch unit and element operative upon deenergization of said control element to actuate said members in unison.

4. A device of the character described comprising a driving member including a ratchet wheel, a driven member, a clutch unit including a clutch operating pawl adapted to engage said ratchet to rotate said members in unison, an electromagnetic control unit, means associated with the control unit and operated upon energization of the control unit to prevent engagement of said pawl and ratchet until the said control unit is subsequently deenergized, and means to disengage the said pawl and ratchet after a predetermined movement of the clutch unit.

5. A device of the character described comprising a driving member including a ratchet wheel, a driven member, a clutch unit including a clutch operating pawl adapted to engage said ratchet to rotate said members in unison, an electromagnetic control unit, means associated with the control unit and operated upon energization of the control unit to prevent engagement of said pawl and ratchet until the said control unit is subsequently deenergized, means to disengage the said pawl and ratchet after a predetermined movement of the clutch unit, and means to impart additional rotation to said clutch unit after the disengagement of said pawl and ratchet.

6. The invention set forth in claim 5 in which means are provided to lock the clutch unit in the inoperative position when said additional rotation is imparted thereto.

CHARLES R. DOTY.
KURT R. SCHNEIDER.
ALBERT C. HOLT.